United States Patent
Birukawa et al.

(10) Patent No.: US 6,690,626 B2
(45) Date of Patent: Feb. 10, 2004

(54) OPTICAL DISK WITH MAGNETIC LAYER SEPARATED MAGNETICALLY BETWEEN TRACKS AND METHOD OF MAGNETICALLY SEPARATING TRACKS OF THE OPTICAL DISK

(75) Inventors: Masahiro Birukawa, Hirakata (JP); Tomoyuki Hiroki, Zama (JP); Yasushi Hozumi, Ageo (JP)

(73) Assignees: Matsushita Electric Industrial Co., Ltd., Osaka (JP); Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/125,143

(22) Filed: Apr. 18, 2002

(65) Prior Publication Data

US 2002/0154580 A1 Oct. 24, 2002

(30) Foreign Application Priority Data

Apr. 19, 2001 (JP) ........................................ 2001-120686

(51) Int. Cl.⁷ .............................. G11B 11/00; G11B 7/24
(52) U.S. Cl. ............................... 369/13.55; 369/13.42; 369/275.4; 428/64.3; 428/694 ML
(58) Field of Search .......................... 369/13.55, 13.54, 369/13.05, 275.6, 275.3, 275.1, 13.42, 13.06, 13.07, 13.47, 13.41; 428/64.3, 332, 694 ML; 427/128

(56) References Cited

U.S. PATENT DOCUMENTS

| | | | |
|---|---|---|---|
| 5,936,915 A | * | 8/1999 | Fujii et al. ............... 369/13.42 |
| 5,966,348 A | | 10/1999 | Hashimoto et al. |
| 5,995,472 A | * | 11/1999 | Fujii et al. ............... 369/13.05 |
| 6,027,825 A | | 2/2000 | Shiratori et al. |
| 6,147,939 A | | 11/2000 | Takahashi et al. |
| 6,249,489 B1 | * | 6/2001 | Fujii et al. ............... 369/13.54 |
| 6,265,062 B1 | * | 7/2001 | Shiratori ....................... 428/332 |
| 6,399,174 B1 | * | 6/2002 | Shiratori et al. ........... 428/64.3 |
| 6,403,148 B1 | * | 6/2002 | Shiratori et al. ............. 427/128 |

FOREIGN PATENT DOCUMENTS

| | | |
|---|---|---|
| JP | 6-290496 | 10/1994 |
| JP | 8-147777 | 6/1996 |
| JP | 10-91938 | 4/1998 |
| JP | 10-340493 | 12/1998 |
| JP | 11-126381 | 5/1999 |
| JP | 11-126386 | 5/1999 |
| JP | 11-134730 | 5/1999 |
| JP | 11-213375 | 8/1999 |

* cited by examiner

*Primary Examiner*—Ali Neyzari
(74) *Attorney, Agent, or Firm*—Merchant & Gould P.C.

(57) ABSTRACT

On a disk-shaped substrate in which a predetermined region ranging in a radial direction is used as a data region for recording/reproduction, a first dielectric layer, a magnetic layer, and a second dielectric layer are provided. The data region includes recording/reproducing tracks composed of a plurality of discontinuous grooves or lands ranging from an innermost track to an outermost track. Magnetic anisotropy of each of magnetic layers positioned between the respective recording/reproducing tracks is reduced to a level lower than that of magnetic anisotropy of the magnetic layers positioned on the recording/reproducing tracks, so that the magnetic layers are magnetically separated only between the recording/reproducing tracks and not magnetically separated in flat portions without grooves. Thus, reflectance is even in the flat portions, thereby allowing tilt detection.

3 Claims, 5 Drawing Sheets

OPTICAL DISK WITH MAGNETIC LAYER SEPARATED MAGNETICALLY BETWEEN TRACKS AND METHOD OF MAGNETICALLY SEPARATING TRACKS OF THE OPTICAL DISK

BACKGROUND OF THE INVENTION

1. Field of the Invention

The present invention relates to an optical disk that is used for information recording or reproduction.

2. Related Background Art

It has been desired in the area of optical disks to achieve higher-density information recording. A method for realizing such high-density recording has been proposed in the form of a DWDD (domain wall displacement detection) type optical disk.

In the DWDD type optical disk, it is necessary to weaken magnetic coupling between adjacent recording tracks. Therefore, when manufacturing the DWDD type optical disk, prior to recording of information signals, a magnetically separating process for magnetically separating adjacent recording tracks is performed. The magnetically separating process is performed by methods such as those disclosed in JP 6(1994)-290496 A and JP10(1998)-340493 A.

Figure 5:
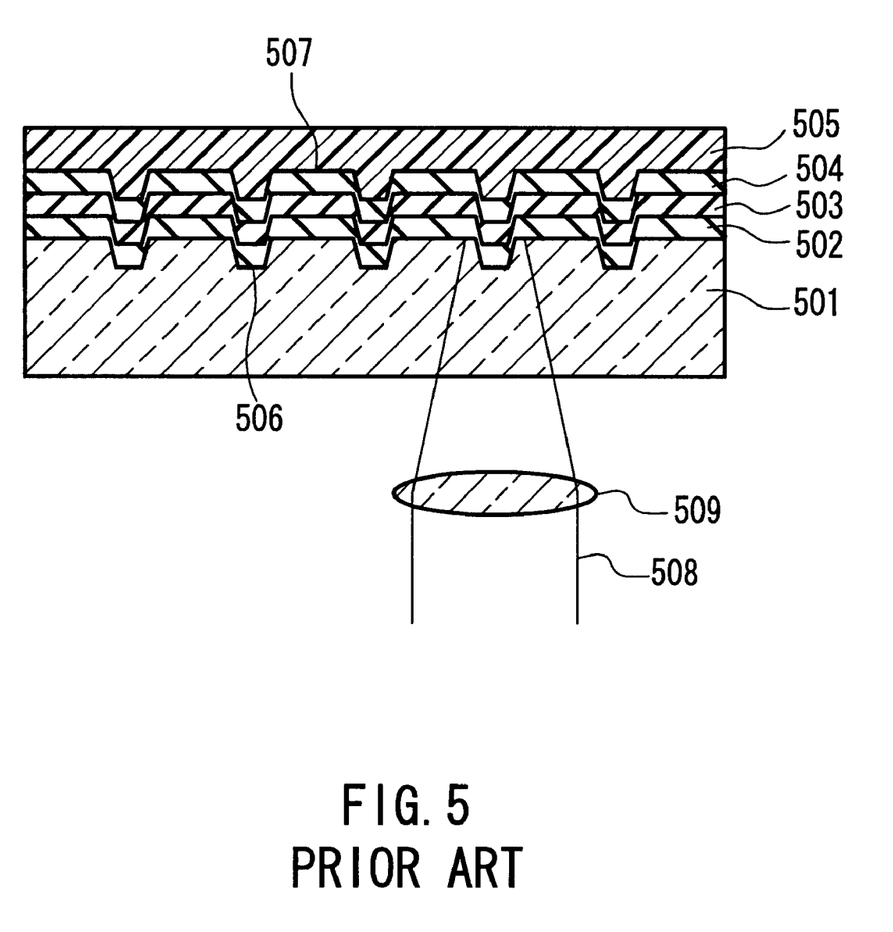
FIG. 5 is a cross sectional view showing a configuration of a conventional optical disk and an operation performed in a magnetically separating process according to a conventional technique.

A structure of the DWDD type optical disk and a method of magnetically separating process according to a conventional technique are described as examples with reference to FIG. 5. In an optical disk shown in FIG. 5, a first dielectric layer 502, a magnetic layer 503, a second dielectric layer 504, and a protective coating layer 505 are laminated in this order on a substrate 501. On a surface of the substrate 501 on a side of the thin film layers, grooves 506 are formed. A portion between two of the grooves 506 adjacent to each other in a radial direction is referred to as a land 507 that is used as a recording/reproducing track. The grooves 506 have a width of, for example, 0.2 μm, and the lands 507 have a width of 1.4 μm. The magnetic layer 503 includes at least three magnetic thin films that are used for reproduction employing a DWDD system. In order for the DWDD system to be performed, it is necessary to magnetically separate the lands 507 as the tracks used for recording/reproduction.

The following description is directed to a method of performing the magnetically separating process with respect to this optical disk. In the magnetically separating process, a laser beam 508 to be used for annealing is focused on the groove 506 by an objective lens 509 and allowed to scan along the grooves 506, so that magnetic coupling between the magnetic layers 503 on the grooves 506 is lost. As a result, in each of the lands 507, which is a region interposed between the grooves 506 that have been subjected to annealing, both sides of the land 507 is magnetically separated, thereby allowing a DWDD operation to be performed. The laser beam 508 used in this process has, for example, a laser power of 2 mW and a wavelength λ of 780 nm. The objective lens 509 has a NA of 0.5, and a beam spot of about 800 nm in diameter is formed. The beam spot of the laser beam 508 travels at a speed of, for example, 2 m/second.

When the lands 507 interposed between the grooves 506 are used as the recording/reproducing tracks as in the foregoing description, at an innermost or outermost end of a recording/reproducing track region, the groove 506 is provided. That is, even the land 507 positioned at the innermost or outermost end is interposed between the grooves 506. Accordingly, both sides of each of all land tracks can be magnetically separated by allowing the laser beam 508 for annealing to scan over all the grooves 506.

In many of recordable type optical disks with tracking guide grooves, an address represented by a track number and a sector number is composed of pit rows of a length of several tens of microns. In regions in which the pit rows are provided, the grooves are interrupted. That is, these pits are provided in flat surfaces without the grooves.

Essentially, an optical disk is designed so that a light beam is incident in a direction perpendicular to a disk surface, whether in recording or in reproduction. When a light beam is incident at an angle (when a tilt is caused), it causes adverse effects such as deterioration in recording sensitivity, reproducing sensitivity, and resolving power, crosstalk, crosserase, or the like.

On the other hand, as the information oriented society advances, optical disks have been requested to achieve higher-density recording, and thus demands for adaptability to a high-NA objective lens and reduction in thickness of a disk substrate have been growing. Further, as wider applications of optical disks are being found, environments in which optical disks are used in portable devices such as a still camera and a video camera have been increasing. These environments, however, cause more tilting between a light beam and a disk, and thus some tilt correction methods have been proposed.

Figure 6:
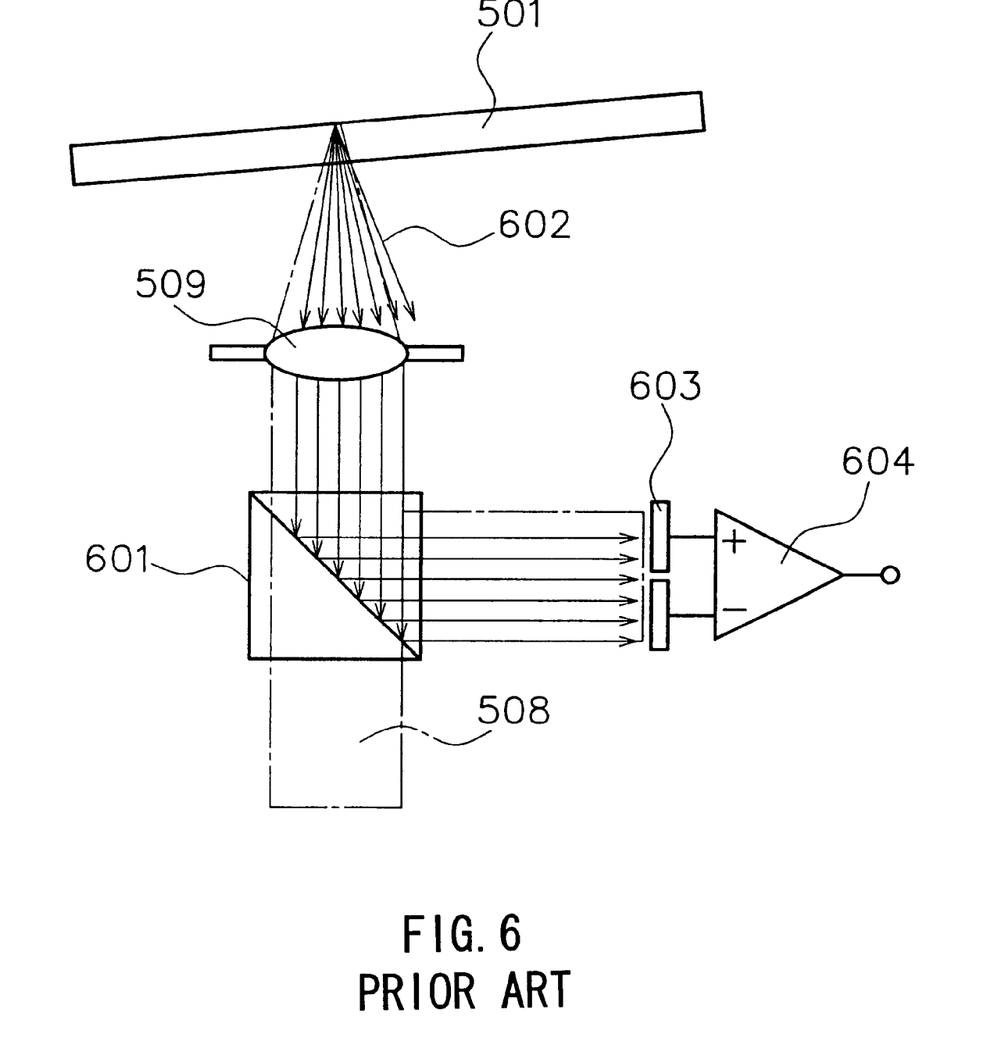
FIG. 6 is a cross sectional view showing a method of correcting a tilt caused between a light beam and an optical disk.

The simplest and most commonly used among such methods is a method shown in FIG. 6. The method utilizes a phenomenon in which an intensity distribution of reflected light depends on a tilt. A laser beam 508 that is used for recording/reproduction is focused by an objective lens 509 via a beam splitter 601 and irradiated onto an optical disk 501. However, when the optical disk 501 is not perpendicular to the laser beam 508, namely, a tilt is caused as shown in the figure, a portion of a reflected light beam 602 reflected from the optical disk 501 is not incident on the objective lens 509. As a result, a differential output corresponding to the tilt is detected from a differential amplifier 604 of a bisected detector 603.

However, in this method, it is necessary as a precondition that no diffraction or variations in reflection should be caused in a beam spot when the reflected light beam 602 is reflected from the optical disk 501. Thus, tilt detection is performed using flat portions (hereinafter, referred to as mirror portions) without grooves on the optical disk 501.

As shown in FIG. 5, when tracks are magnetically separated by allowing a light beam to scan, in each magnetic film positioned between the tracks, magnetic anisotropy is reduced, and a physical and structural change is caused in a central portion. This causes the complex refractive index to be changed, and as a result, reflectance is reduced. Therefore, in a disk having this configuration, when a recording/reproducing beam passes over a track, the reflectance of portions on both sides of the track changes, and thus employing discontinuous grooves and simply providing the mirror portions are not sufficient to enable exact detection of the tilt.

SUMMARY OF THE INVENTION

It is an object of the present invention to provide an optical disk in which, while adjacent recording/reproducing tracks are magnetically separated so that a DWDD operation can be performed, tilting can be detected based on an intensity distribution of reflected light.

An optical disk of the present invention includes a disk-shaped substrate and at least a first dielectric layer, a magnetic layer, and a second dielectric layer that are formed on the substrate. In the substrate, a predetermined region ranging in a radial direction is used as a data region for recording/reproducing data. The data region includes recording/reproducing tracks that are composed of a plurality of discontinuous lands or grooves ranging from an innermost track to an outermost track. The magnetic anisotropy of each of the magnetic layers positioned between the respective recording/reproducing tracks is reduced to a level lower than that of the magnetic anisotropy of the magnetic layers positioned on the recording/reproducing tracks, so that the magnetic layers are magnetically separated only between the recording/reproducing tracks respectively and not magnetically separated in flat portions in which the grooves are interrupted.

According to this configuration, since the magnetically separating region is not provided in the flat portions (mirror portions) in which the recording/reproducing tracks are interrupted, the reflectance is not changed over the flat portions. Accordingly, based on a reflectance held so as to be even, in recording or reproduction, a tilt of a, disk can be detected using light reflected from the mirror portions. Thereby, a change in an optical system caused by the tilt is corrected, and thus an optimum recording power or an optimum reproducing power can be maintained. This process of correcting a tilt is effective particularly in an optical disk employing a DWDD system in which in reproduction, a domain wall is displaced using a temperature distribution and detected.

An optical disk of another configuration according to the present invention includes a disk-shaped substrate with pits and grooves formed by emboss processing, and at least a first dielectric layer, a magnetic layer, and a second dielectric layer that are formed on the substrate. In the substrate, a predetermined region ranging in a radial direction is used as a data region for recording/reproducing data. The data region includes a plurality of recording/reproducing tracks ranging from an innermost track to an outermost track, and is divided into a plurality of segments in a tangential direction. Each segment includes a pit region and a groove region. The pit region is provided with at least a pair of wobble pits to be used for sample servo. The groove region is provided with the recording/reproducing track. The recording/reproducing tracks are composed of the grooves. The magnetic anisotropy of the magnetic layer positioned on each of lands between the respective recording/reproducing tracks is reduced to a level lower than that of the magnetic anisotropy of the magnetic layers positioned on the grooves, so that the magnetic layers are magnetically separated only between the recording/reproducing tracks respectively and not magnetically separated on extensions of the lands in the pit regions.

A method of magnetically separating tracks of an optical disk according to the present invention is a method of magnetically separating the recording/reproducing tracks when the optical disk of the aforementioned configuration is provided. The method includes a process in which a light beam converged to a degree higher than that of a light beam to be used for recording/reproduction is allowed to scan over the lands that correspond to a portion between the recording/reproducing tracks, so that the magnetic anisotropy of the magnetic layers positioned on the lands is reduced to a level lower than that of the magnetic anisotropy of the magnetic layers positioned on the grooves. In the process, when the light beam passes over the pit regions, the power level of the light beam is reduced to such a degree as not to cause irreversible change in the magnetic layers.

DETAILED DESCRIPTION OF THE INVENTION

Figure 1:
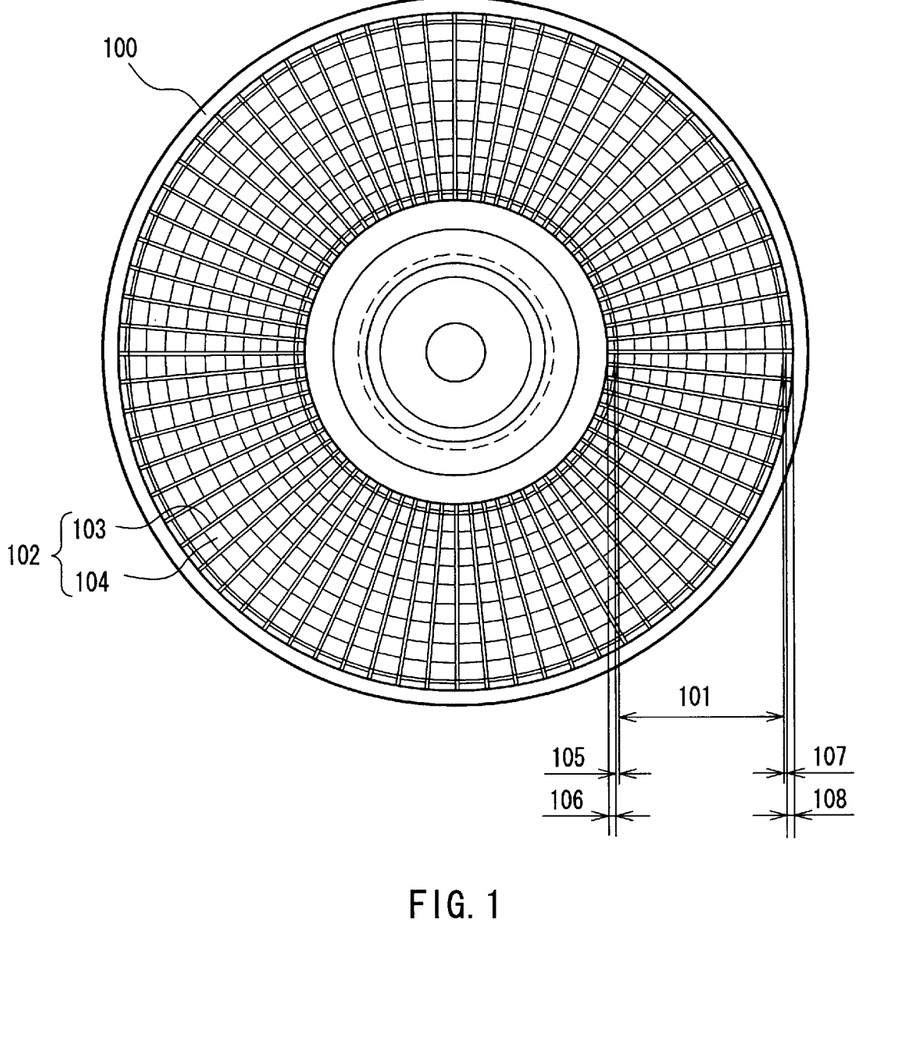
FIG. 1 is a plan view showing a configuration of an optical disk of an embodiment according to the present invention.

FIG. 1 is a plan view of an optical disk of an embodiment according to the present invention. This optical disk has, for example, a disk shape of 50.8 mm in outer diameter, in which a central hole having a diameter of 11 mm is provided. In a data region 101 constituting a main portion of the disk, an innermost track is positioned at a radius of 11.5 mm, and on an inner side of the innermost track, an inner dummy track 105 is provided. On an inner side of the inner dummy track 105, a lead-in region 106 is provided. The lead-in region 106 is a read-only region in which information in the form of pit rows is provided. On an outer side of an outermost track in the data region 101, an outer dummy track 107 is provided in the same manner as in an innermost area. On an outer side of the outer dummy track 107, a lead-out region 108 is provided.

The entire data region 101 is divided equally into 1,280 pieces of segments 102 in a tangential direction. Each of the segments 102 is composed of a pit region 103 in a leading position and a groove region 104 in a position following the leading position. The pit region 103 of the segment 102 has a length of about 5.5 $\mu$m in the tangential direction regardless of a radius at which the pit region 103 is positioned. The groove region 104 of the segment 102 has a length in the tangential direction that increases in a direction toward an outer area. Accordingly, the amount of data stored in each of the segments 102 increases in the direction toward the outer area. The data region 101 is divided into 26 zones in a radial direction, and an amount of data stored in the groove region 104 is different depending upon the zone.

Figure 2:
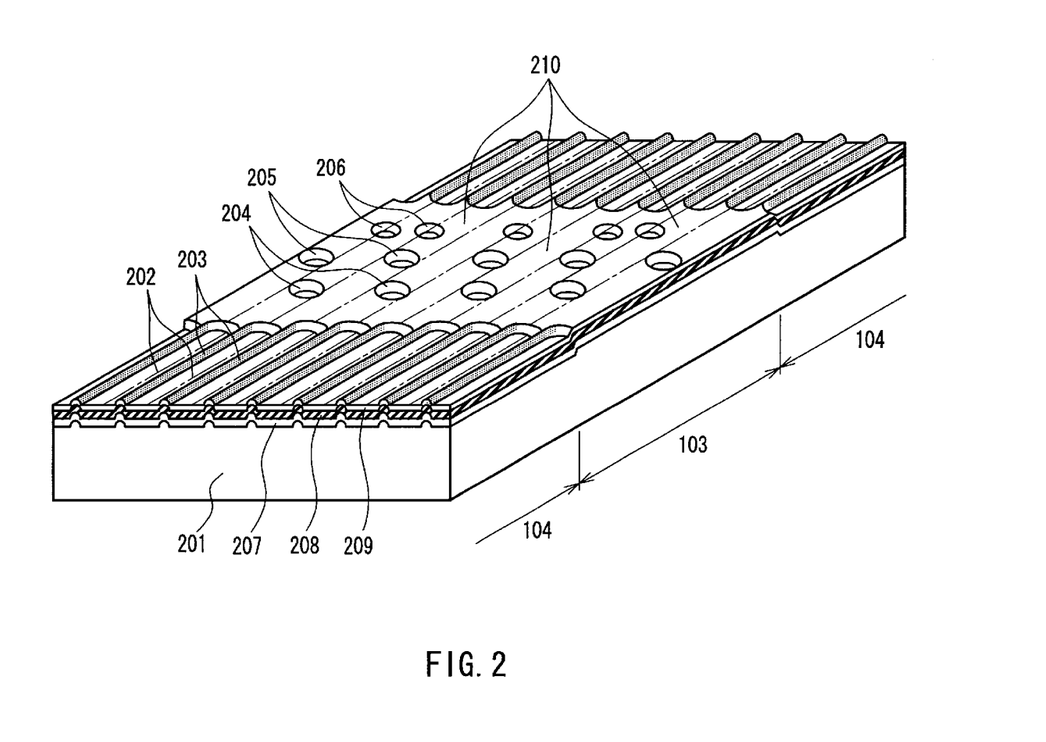
FIG. 2 is a partial expanded view in perspective of the optical disk shown in FIG. 1.
Figure 3:
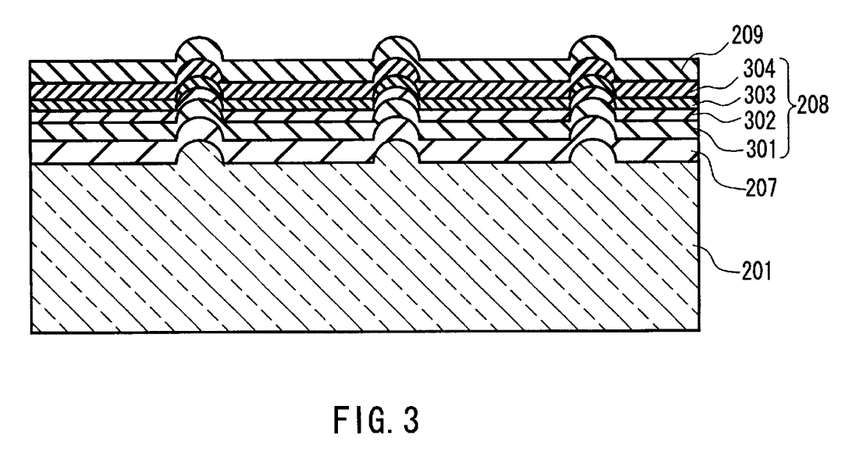
FIG. 3 is a partial expanded view in cross section of the optical disk shown in FIG. 1.

FIG. 2 shows the details of each border portion between the segments 102 in the data region 101 and shows in section a structure of the disk. In this embodiment, pits and grooves are formed by emboss processing on a polycarbonate substrate 201 of 0.6 mm thickness, and each segment composed of the pit region 103 in the leading position and the groove region 104 in the position following the leading position is formed in a repeated manner along the tangential direction. A first dielectric layer 207 of silicon nitride, a magnetic layer 208, and a second dielectric layer 209 of silicon nitride are deposited on the substrate 201. Although not shown in the figure, on the second dielectric layer 209, a protective layer, a lubricant layer, or the like is provided as required. As shown in FIG. 3, the magnetic layer 208 is composed of four layers of magnetic films that are a domain wall displacement layer 301, a control layer 302, a switching layer 303 and a recording layer 304. The respective configurations of these layers are the same as those disclosed in JP11(1999)-134730 A. These layers are configured so as to be adapted to a DWDD reproducing system.

The optical disk having the aforementioned configuration is manufactured by a method that follows the below-mentioned process steps in order.

1) A photo-resist coating is applied to a glass master disk of 6 mm thickness.
2) Cutting (exposure) is performed using a laser having a wavelength of 351 nm and an objective lens having a NA of 0.9.
3) Development is performed, and portions exposed in the previous step are removed.
4) A heat treatment is performed at a temperature of 150° C. for about 30 minutes.
5) On the glass master disk, a nickel film is formed by sputtering.
6) Plating is performed.
7) The film is stripped from the disk and the disk is used as a stamper.
8) By molding using the stamper thus manufactured as a mold, a polycarbonate substrate is manufactured.
9) A silicon nitride film, a domain wall displacement layer, a control layer, a switching layer, a recording layer and a silicon nitride film are deposited in this order on the substrate.
10) A magnetically separating process is performed.

By the aforementioned process steps, the optical disk having the configuration shown in FIGS. 2 and 3 is manufactured.

In the following description, a structure of each border portion between the segments 102 in the data region 101 will be detailed by referring back to FIG. 2. In this embodiment, each of the pit regions 103 is a flat portion in which a groove 202 is not formed and provided with a first wobble pit 204, a second wobble pit 205, and an address pit 206. The first wobble pit 204 and the second wobble pit 205 are used for obtaining a tracking-error signal to be used for sample servo and provided so as to correspond to both groove tracks adjacent to these pits, respectively. Accordingly, the first wobble pit 204 and the second wobble pit 205 are present in all the segments. On the other hand, the address pit 206 is present in some segments and is absent in other segments. One sector is composed of 80 segments arranged continuously in the tangential direction, and an address represented by a track number and a sector number is defined by using combinations of the presence or absence of the address pit 206 in 80 positions corresponding to the address pits 206 in each sector.

In recording/reproduction, clock extraction is carried out in such a manner that a position of a wobble pit or a groove edge is detected to be synchronized with a clock. Therefore, the need for particularly providing a clock pit is eliminated. According to this configuration, that is, only a pair of the wobble pits 204 and 205 and one address pit 206 are provided in the pit region 103 in each segment, the pit regions 103 are allowed to have a length in the tangential direction, namely, an interval at which lands 203 are interrupted, of about 5.5 µm over the entire region of the disk.

Figure 4:
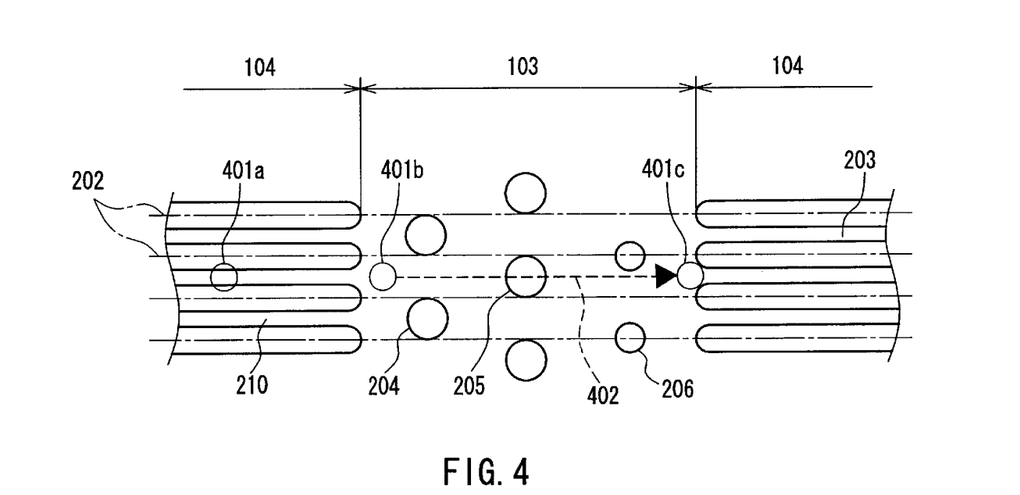
FIG. 4 is a partial expanded plan view of the optical disk shown in FIG. 1 for showing an operation performed in a magnetically separating process.

In the following description, an effect that can be provided when the pit regions have a length of about 5.5 µm will be detailed with reference to FIG. 4. In the present invention, as will be described later, the grooves 202 are used as tracks for data recording/reproduction. Therefore, when the magnetic separation is performed, a beam spot is allowed to scan over the lands 203 each formed in a portion between the grooves 202. As means for performing magnetic separation, a laser having a wavelength of 405 nm and an objective lens having a NA of 0.85 are used, and a laser beam is focused on the optical disk so as to make a beam spot 401 to be used for a magnetically separating process. Beam spots 401a, 401b and 401c show a state in which the same beam spots 401 are located at different positions, respectively. The spot 401 has a diameter of 0.28 µm. A knife edge method and a push-pull method (both are known techniques) are used for focus error detection and tracking error detection, respectively. The spot 401 is allowed to scan over the lands 203, each formed in a portion between the grooves 202.

In this scanning, when the beam spot 401a, which has passed over the groove region 104 on a left side in the figure, enters the pit region 103, the power level of the beam spot 401b is reduced to such a degree as not to cause an irreversible change in the optical disk, and the beam spot 401b is allowed to pass over the pit region 103. At this time, while turning off tracking servo temporarily is effective, it is not necessarily required as long as the pit regions 103 have a length of about 5.5 µm as described above. In this case, the beam spot 401 to be used for the magnetically separating process is allowed to pass along a trajectory 402.

The beam spot 401 travels by inertia, and when the beam spot 401 enters the groove region 104 again (at a position of the beam spot 401c), the amount of off-tracking becomes great, and thus the tracking operation no longer may work well. However, in this embodiment, by setting the pit regions to have a length of about 5.5 µm, a stable tracking operation always can be performed without employing a particular operation such as switching of tracking servo so as to repeat turning on and off in each segment. That is, since the interval at which the land 203 is interrupted is small, less influence is exerted by each interruption of the land, thereby allowing the beam spot 401 to be lead smoothly back to the next land 203. As a result, even in the case where the disk has the maximum eccentricity, the amount of the off-tracking caused during interruptions of the land 203 is suppressed to such a degree that is permissible from a practical viewpoint. Therefore, even if the lands are formed intermittently, the tracking functions without fail.

When the beam spot 401 enters the next land 203, the power level of the beam spot 401 is restored to a level required for the magnetically separating process, and the beam spot 401 immediately is allowed to trace the land 203.

In the following description, this embodiment will be explained in greater detail by referring back to FIG. 2. In FIG. 2, the grooves 202 are used as tracks for data recording/reproduction. A distance between the center lines of two adjacent grooves 202, namely, the track pitch, is 0.54 µm. The grooves 202 have a 0.44 µm width of half maximum and the lands 203 have a 0.1 µm width of half maximum. Further, the grooves have a depth of 30 to 60 nm, and each slope of the grooves has an inclination angle of 50 to 55 degrees. In a process of manufacturing a stamper used for subjecting the substrate 201 to the emboss processing, a photo-resist coating is applied to a raw disk to be a master, and portions corresponding to the grooves 202 are exposed to a laser beam. In the exposure, a laser having a wavelength of 351 nm and an objective lens having a NA of 0.9 are used, and a beam spot of about 0.23 µm in diameter is formed. In the case of forming the grooves 202 having a width narrower than that, a particular exposure system such as an electron beam exposure system is required. However, by using the grooves 202 with a wider width and the lands 203 with a narrower width as in this embodiment, it is made possible to obtain a track pitch as narrow as 0.54 µm without using such a system. The optical disk used in this embodiment is adapted to an operation in which a semiconductor laser having a wavelength of 650 nm and an objective lens having a NA of 0.6 are used, and recording/reproduction is performed by allowing a beam spot that has passed through the substrate 201 to scan over the grooves 202.

Furthermore, as shown in FIG. 2, in this embodiment, the magnetic layer 208 is magnetically separated only on the lands 203 and is not magnetically separated in portions positioned on extensions of the lands 203 in the pit regions 103. In forming magnetically separating regions 210, a laser having a wavelength of 405 nm and an objective lens having a NA of 0.85 are used, and a converged beam spot is allowed to scan along the lands 203. As described above, the aforementioned magnetically separating process is performed in such a manner that when a scanning laser beam passes over the pit regions 103, the power level of the laser beam is reduced. In an example, a laser beam was set to have a power level of 7 mW when passing over the lands 203 and a power level of 1 mW when passing over the pit regions 103.

In each of the magnetically separating regions 210 formed in this manner, the perpendicular anisotropy constant of the magnetic film is reduced, so that under the influence of a demagnetizing field, an easy magnetization axis is changed from a perpendicular direction to an in plane direction with respect to a film surface. As a result, the magnetic film is brought to a state of being magnetically separated at the magnetically separating regions 210, and thus a magnetic domain boundary (domain wall) in the perpendicular magnetic film cannot exist. As disclosed in JP11(1999)-213375 A, this process of magnetic separation is important in performing the DWDD operation.

A recording/reproduction test was performed using the optical disk of this embodiment, in which the grooves 202 in the data region 101 were used as recording/reproducing tracks. As an optical system, a semiconductor laser having a wavelength of 650 nm and an objective lens having a NA of 0.6 were used. Tracking servo was operated by sample servo using a pair of wobble pits. A linear velocity was 3 m/second, and a light pulse having a duty ratio of 50% and a peak power of 8 mW was used to perform magnetic field modulation recording in which a magnetic field is modulated according to information to be recorded. A recording frequency was 15 MHz. As a result, in each track over the entire data region 101 from the innermost track to the outermost track, an excellent DWDD property could be obtained. Thus, it was confirmed that magnetically separating regions were formed properly in the lands 203 on both sides of each of all the groove tracks over the entire data region 101 from the innermost track to the outermost track.

Using an optical disk having the aforementioned configuration, recording was performed, with an optical head tilted, using a laser driving circuit of a tilt compensation type. As a result, both in cases where a tilt was not corrected and where a tilt was compensated using light reflected from flat portions which was subjected to the magnetically separating process, a tilt margin was ±0.5 degrees. In contrast, in the case where a tilt was compensated using light reflected from the flat portions which was not subjected to the magnetically separating process, a tilt margin could be increased to ±0.8 degrees. This explains that the flat portions can exert the effect of compensating a tilt when they are not subjected to the magnetically separating process, while providing no such effect when subjected to the magnetically separating process.

In the aforementioned embodiment, the disk had an outer diameter of 50.8 mm. However, the present invention neither requires a limit nor is limited in the size of a disk. Further, the disk is not limited to 11 mm in the diameter of a central hole, and the present invention is applicable to disks with central holes of any size. Further, in the aforementioned embodiment, a polycarbonate substrate of 0.6 mm in thickness was used as the substrate. However, the present invention is applicable to disks with substrates of any thickness, for example, 0.5 mm, 0.6 mm, 1.2 mm, or the like. A material of the substrate also is not limited to polycarbonate. The present invention is applicable to disks with substrates of any materials, on which pits and grooves are formed by emboss processing, such as other plastic materials and a glass substrate to which photopolymer is applied.

Furthermore, in the aforementioned embodiment, a silicon nitride thin film was used as the first and second dielectric layers. However, the present invention is applicable to the cases of using other materials such as transparent dielectric materials including AlN, $SiO_2$, SiO, ZnS, and MgF, or a composite material of these compounds.

Moreover, in the aforementioned embodiment, the magnetic layer was composed of four layers that were the domain wall displacement layer, the control layer, the switching layer and the recording layer. The control layer was provided for adjusting an exchange coupling force between the recording layer and the domain wall displacement layer. Since the exchange coupling force depends on a film-deposition system and film-deposition conditions, the control layer is not necessarily required. Further, the domain wall displacement layer should meet at least the following two requirements: a domain wall driving force due to a temperature gradient is large; and a Kerr rotation angle is large. In order for the domain wall displacement layer to meet these requirements, it also is effective in applying the present invention that the domain wall displacement layer is composed of some of the layers.

In addition, in the aforementioned embodiment, the disk was divided into 26 zones in the radial direction. However, the present invention is applicable regardless of the number of the zones. Further, the aforementioned embodiment employed a configuration in which each track was divided into 1,280 segments, and 80 segments were used to define one set of addresses. However, the present invention is not limited to these numbers of the segments.

Furthermore, in the aforementioned embodiment, only the first wobble pit, the second wobble pit, and the address pit were provided in each of the pit regions. However, in the present invention, it is only required that the interval at which the lands are interrupted by the pit regions be not more than 20 µm, desirably, not more than 7 µm. As long as the interval falls within this range, it also is possible to include a clock pit or another type of wobble pit in addition to the aforementioned pits.

Moreover, in the aforementioned embodiment, one sector is composed of 80 segments arranged continuously in the tangential direction, and an address number represented by a track number and a sector number is defined by using combinations of the presence or absence of the address pit in 80 positions corresponding to the address pits in each sector. This configuration is disclosed as one embodiment for realizing the interval at which the lands are interrupted of not more than 20 µm, desirably, not more than 7 µm. However, the present invention is not limited thereto.

In addition, in the aforementioned embodiment, the grooves have a 0.44 µm width of half maximum, and the lands have a 0.1 µm width of half maximum. The grooves have a depth of 30 to 60 nm, and each of the slopes of the grooves has an inclination angle of 50 to 55 degrees. However, the present invention is not limited to these values. The present invention is effective with respect to all configurations in which tracks are magnetically separated by allowing a light beam to scan, and a DWDD operation is performed on recording/reproducing tracks.

Furthermore, in the aforementioned embodiment, the magnetically separating regions were formed using the laser having a wavelength of 405 nm and the objective lens having a NA of 0.85. However, the present invention is not limited thereto, and a red laser or an ultraviolet laser may be used. However, it is necessary to adapt the width of the lands to the diameter of a converged beam spot.

As described in the foregoing discussion, according to the optical disks of the present invention, while adjacent recording/reproducing tracks are magnetically separated so that a DWDD operation can be performed, tilting can be detected based on an intensity distribution of reflected light. Therefore, even when a tilt is caused in an optical disk, the tilt can be detected, and thus recording or reproducing power can be compensated properly. As a result, a tilt margin can be increased.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk, comprising:

a disk-shaped substrate in which a predetermined region ranging in a radial direction is used as a data region for recording/reproducing data; and at least a first dielectric layer, a magnetic layer, and a second dielectric layer that are formed on the substrate, wherein the data region includes recording/reproducing tracks that are composed of a plurality of discontinuous lands or grooves ranging from an innermost track to an outermost track;

the grooves are interrupted in a tangential direction so that a flat portion is formed at the interrupted region; and the magnetic anisotropy of each of the magnetic layers positioned between the respective recording/reproducing tracks is reduced to a level lower than that of the magnetic anisotropy of the magnetic layers positioned on the recording/reproducing tracks, so that the magnetic layers are magnetically separated only between the recording/reproducing tracks respectively and not magnetically separated in the flat portions in which the grooves are interrupted.

2. An optical disk, comprising:

a disk-shaped substrate with pits and grooves formed by emboss processing, in which a predetermined region ranging in a radial direction is used as a data region for recording/reproducing data; and at least a first dielectric layer, a magnetic layer, and a second dielectric layer that are formed on the substrate, wherein the data region includes a plurality of recording/reproducing tracks ranging from an innermost track to an outermost track, and is divided into a plurality of segments in a tangential direction, each segment including a pit region and a groove region;

the pit region is provided with at least a pair of wobble pits to be used for sample servo;

the groove region is provided with the recording/reproducing track;

the recording/reproducing tracks are composed of the grooves; and the magnetic anisotropy of the magnetic layer positioned on each of lands between the respective recording/reproducing tracks is reduced to a level lower than that of the magnetic anisotropy of the magnetic layers positioned on the grooves, so that the magnetic layers are magnetically separated only between the recording/reproducing tracks respectively and not magnetically separated on extensions of the lands in the pit regions.

3. A method of magnetically separating the recording/reproducing tracks when providing the optical disk according to claim 2, comprising a process in which a light beam converged to a degree higher than that of a light beam to be used for recording/reproduction is allowed to scan over the lands that correspond to a portion between the recording/reproducing tracks, so that the magnetic anisotropy of the magnetic layers positioned on the lands is reduced to a level lower than that of the magnetic anisotropy of the magnetic layers positioned on the grooves, wherein in the process, when the light beam passes over the pit regions, a power level of the light beam is reduced to such a degree as not to cause irreversible change in the magnetic layers.

* * * * *